US008655474B2

(12) United States Patent
Katano et al.

(10) Patent No.: US 8,655,474 B2
(45) Date of Patent: Feb. 18, 2014

(54) EMBROIDERY DATA GENERATING APPARATUS, EMBROIDERY DATA GENERATING METHOD, AND NON-TRANSITORY COMPUTER-READABLE MEDIUM STORING EMBROIDERY DATA GENERATING PROGRAM

(75) Inventors: Tomotaka Katano, Nagoya (JP); Takashi Hirata, Nagoya (JP); Chiyo Koga, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 395 days.

(21) Appl. No.: 13/026,819

(22) Filed: Feb. 14, 2011

(65) Prior Publication Data
US 2011/0218665 A1 Sep. 8, 2011

(30) Foreign Application Priority Data

Mar. 2, 2010 (JP) ................. 2010-044828

(51) Int. Cl.
*D05C 5/02* (2006.01)
(52) U.S. Cl.
USPC .............. 700/138; 112/470.01; 112/470.04; 112/475.19
(58) Field of Classification Search
USPC .............. 700/136–138; 112/470.01, 470.04, 112/470.06, 475.18, 475.19
See application file for complete search history.

(56) References Cited

U.S. PATENT DOCUMENTS

| 5,765,496 | A | * | 6/1998 | Futamura | 112/475.19 |
| 5,880,963 | A | | 3/1999 | Futamura | |
| 5,896,822 | A | * | 4/1999 | Futamura | 112/475.19 |
| 5,954,004 | A | * | 9/1999 | Futamura | 112/475.19 |
| 5,960,726 | A | * | 10/1999 | Yamada | 112/475.19 |
| 6,356,648 | B1 | * | 3/2002 | Taguchi | 700/138 |
| RE38,718 | E | * | 3/2005 | Futamura | 700/138 |
| 7,587,257 | B2 | * | 9/2009 | Niimi et al. | 700/138 |

FOREIGN PATENT DOCUMENTS

| JP | A-62-276069 | 11/1987 |
| JP | A-7-150409 | 6/1995 |
| JP | A-9-122367 | 5/1997 |
| JP | A-2003-41477 | 2/2003 |
| JP | A-2011-177357 | 9/2011 |

OTHER PUBLICATIONS

U.S. Appl. No. 13/414,311 filed in the name of Katano et al. Mar. 7, 2012.

* cited by examiner

*Primary Examiner* — Nathan Durham
(74) *Attorney, Agent, or Firm* — Oliff PLC

(57) ABSTRACT

An embroidery data generating apparatus that includes a pattern data acquisition device that acquires pattern data, an area identification device that identifies a base area in which a plurality of base stitches including a plurality of intersecting portions are to be formed, each of the intersecting portions being a portion at which two base stitches extending in different directions intersect, a first generating device that generates first sewing data to be used to sew the base stitches in the base area, a sewing data acquisition device that acquires second sewing data to be used to sew a pattern represented by the pattern data in an area including at least a part of the base area, and an embroidery data generating device that generates embroidery data including the first sewing data and the second sewing data.

17 Claims, 19 Drawing Sheets

FIG. 9

| N-TH LAYER | STITCH DIRECTION (DEGREES) |
|---|---|
| 1 | 90 |
| 2 | 0 |
| 3 | 45 |
| 4 | 135 |
| ⋮ | ⋮ |

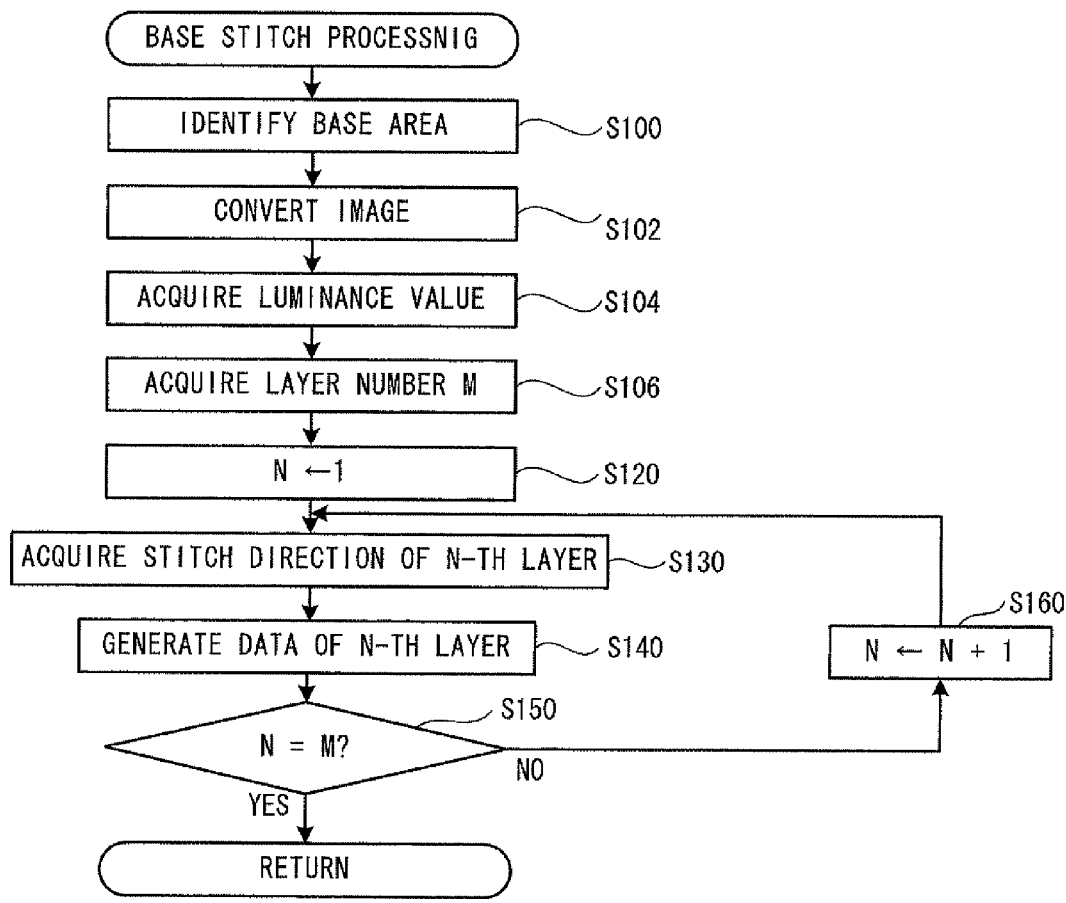

EMBROIDERY DATA GENERATING APPARATUS, EMBROIDERY DATA GENERATING METHOD, AND NON-TRANSITORY COMPUTER-READABLE MEDIUM STORING EMBROIDERY DATA GENERATING PROGRAM

CROSS-REFERENCE TO RELATED APPLICATION

This application claims priority to Japanese Patent Application No. 2010-044828, filed Mar. 2, 2010, the disclosure of which is hereby incorporated by reference in its entirety.

BACKGROUND

The present invention relates to an embroidery data generating apparatus, an embroidery data generating method and a non-transitory computer-readable medium storing an embroidery data generating program that generate embroidery data for sewing an embroidery pattern using an embroidery sewing machine.

An embroidery data generating apparatus is known that generates embroidery data to be used to sew an embroidery pattern on a work cloth. Generally, the known embroidery data generating apparatus generates embroidery data in the following manner. First, based on an image of a desired embroidery design, the shape of an embroidery area is automatically determined. Next, embroidery data to form stitches of a type specified by a user is generated in an area surrounded by an outer contour of the embroidery area.

Further, a manufacturing method for a decorative material is known in which, after stitches or an embroidery pattern are formed on a water soluble material, the water soluble material is dissolved and removed to obtain an embroidered object. The embroidered object is a sewn object whose shape can be maintained by the stitches of the embroidery pattern alone.

SUMMARY

The embroidery data that is generated by the above-described known embroidery data generating apparatus is not generated on the assumption that the embroidered object is formed only by the stitches of the embroidery pattern. Therefore, if the embroidery pattern is formed on a water soluble material, which is a sewing target object, based on this type of embroidery data, the stitches of the embroidery pattern may ravel when the water soluble material is dissolved and removed. As a result, it may not be possible to obtain the embroidered object.

Various exemplary embodiments of the general principles herein provide an embroidery data generating apparatus, an embroidery data generating method, and a non-transitory computer-readable medium storing the embroidery data generating program that generate embroidery data used to sew an embroidery pattern that is suitable for forming an embroidered object by removing a sewing target object.

Exemplary embodiments herein provide an embroidery data generating apparatus that includes a pattern data acquisition device, an area identification device, a first generating device, a sewing data acquisition device, and an embroidery data generating device. The pattern data acquisition device acquires pattern data representing a pattern that is a target to generate embroidery data. The area identification device identifies a base area that is an area in which a plurality of base stitches are to be formed, the plurality of base stitches including a plurality of intersecting portions, each of which is a portion at which two base stitches of the plurality of base stitches intersect, the two base stitches extending in directions different from each other. The first generating device generates first sewing data to be used to sew the plurality of base stitches in the base area identified by the area identification device. The sewing data acquisition device acquires second sewing data to be used to sew the pattern represented by the pattern data acquired by the pattern data acquisition device, in an area that includes at least a part of the base area identified by the area identification device. The embroidery data generating device generates embroidery data which includes the first sewing data generated by the first generating device and the second sewing data acquired by the sewing data acquisition device, and in which a sewing order of the first sewing data is set to be in advance of a sewing order of the second sewing data.

Exemplary embodiments also provide an embroidery data generating method performed by a computer. The embroidery data generating method includes the steps of acquiring pattern data representing a pattern that is a target to generate embroidery data, identifying a base area that is an area in which a plurality of base stitches are to be formed, the plurality of base stitches including a plurality of intersecting portions, each of which is a portion at which two base stitches of the plurality of base stitches intersect, the two base stitches extending in directions different from each other, generating first sewing data to be used to sew the plurality of base stitches in the base area, acquiring second sewing data to be used to sew the pattern represented by the pattern data in an area that includes at least a part of the base area, and generating embroidery data which includes the first sewing data and the second sewing data, and in which a sewing order of the first sewing data is set to be in advance of a sewing order of the second sewing data.

Exemplary embodiments further provide a non-transitory computer-readable medium storing an embroidery data generating program. The embroidery data generating program includes instructions, when executed, to cause a computer to perform the steps of acquiring pattern data representing a pattern that is a target to generate embroidery data, identifying a base area that is an area in which a plurality of base stitches are to be formed, the plurality of base stitches including a plurality of intersecting portions, each of which is a portion at which two base stitches of the plurality of base stitches intersect, the two base stitches extending in directions different from each other, generating first sewing data to be used to sew the plurality of base stitches in the base area, acquiring second sewing data to be used to sew the pattern represented by the pattern data in an area that includes at least a part of the base area, and generating embroidery data which includes the first sewing data and the second sewing data, and in which a sewing order of the first sewing data is set to be in advance of a sewing order of the second sewing data.

BRIEF DESCRIPTION OF THE DRAWINGS

Exemplary embodiments of the present disclosure will be described below in detail with reference to the accompanying drawing in which:

FIG. 9 is a table that shows an associated relationship between an N-th layer of stitches and an extending direction of the stitches;

FIG. 19 is a flowchart of a modified example of the base stitch processing that is performed in the main processing shown in FIG. 6.

DETAILED DESCRIPTION

Figure 1:
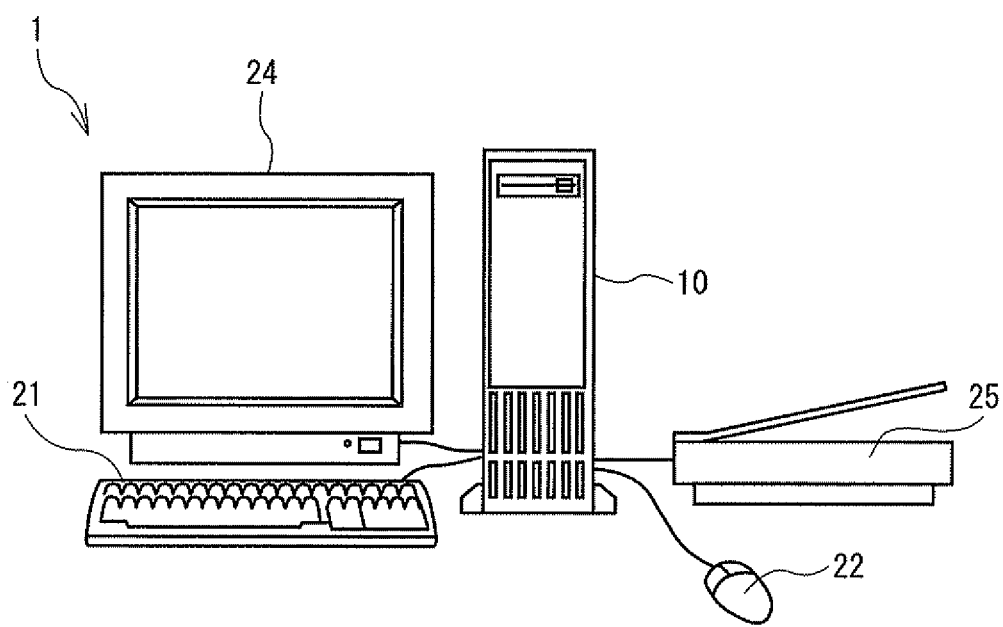
FIG. 1 is an overall configuration diagram that shows a physical configuration of an embroidery data generating apparatus 1.

Hereinafter, an embroidery data generating apparatus 1 according to an embodiment of the present invention will be explained with reference to the drawings. Note that the referenced drawings are used to explain technological features that can be employed in the present invention. Apparatus configurations, flowcharts and the like that are shown in the drawings are merely explanatory examples.

Figure 2:
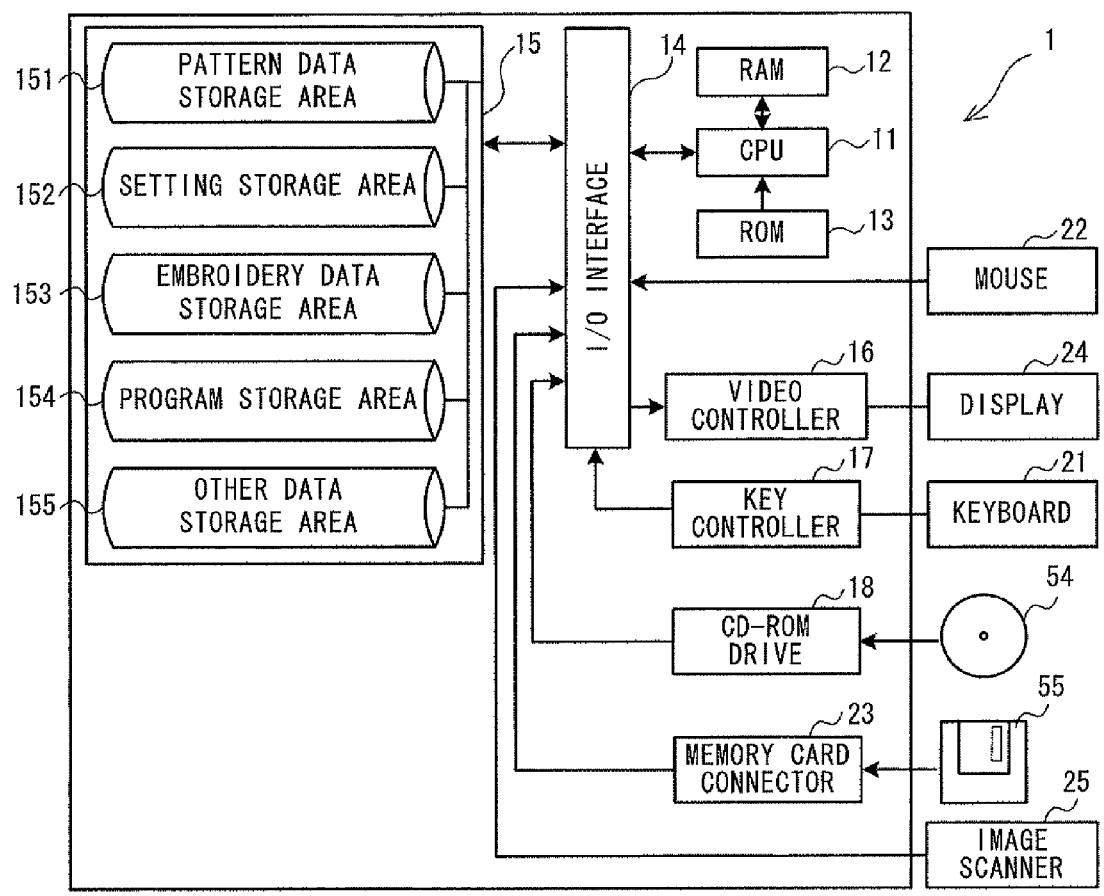
FIG. 2 is a block diagram that shows an electrical configuration of the embroidery data generating apparatus 1.

First, a configuration of the embroidery data generating apparatus 1 will be explained with reference to FIG. 1 and FIG. 2. The embroidery data generating apparatus 1 is an apparatus that generates data of an embroidery pattern to be sewn by an embroidery sewing machine 3 (refer to FIG. 3) that will be described later. Particularly, the embroidery data generating apparatus 1 can generate embroidery data to be used to sew an embroidery pattern on a sewing target object, based on image data acquired from an image of a desired embroidery design. The sewing target object may be, for example, a work cloth (not shown in the drawings), a water soluble sheet (not shown in the drawings) or the like. As shown in FIG. 1, the embroidery data generating apparatus 1 may be, for example, a general-purpose apparatus, such as a personal computer. The embroidery data generating apparatus 1 includes an apparatus main body 10. The embroidery data generating apparatus 1 further includes a keyboard 21, a mouse 22, a display 24, and an image scanner 25 that are connected to the apparatus main body 10. Each of the keyboard 21 and the mouse 22 is an input device. The display 24 displays information.

An electrical configuration of the embroidery data generating apparatus 1 will be explained with reference to FIG. 2. As shown in FIG. 2, the embroidery data generating apparatus 1 includes a CPU 11 that is a controller to control the embroidery data generating apparatus 1. A RAM 12, a ROM 13 and an input output (I/O) interface 14 are connected to the CPU 11. The RAM 12 temporarily stores various types of data. The ROM 13 stores a basic input/output system (BIOS) and the like. The I/O interface 14 intermediates transmission and reception of data. A hard disk drive (HDD) 15, the mouse 22, a video controller 16, a key controller 17, a CD-ROM drive 18, a memory card connector 23 and the image scanner 25 are connected to the I/O interface 14. Although not shown in FIG. 2, the embroidery data generating apparatus 1 may be provided with an external interface to connect to an external device or a network.

The HDD 15 includes a plurality of storage areas including a pattern data storage area 151, a setting storage area 152, an embroidery data storage area 153, a program storage area 154, and an other data storage area 155. Pattern data is stored in the pattern data storage area 151. The pattern data represents a pattern that is a target to generate embroidery data. The pattern data is at least one of the image data that represents the pattern and the embroidery data that is to be used to sew the pattern. Various types of setting values that are used in an embroidery data generating processing (which will be described later) are stored in the setting storage area 152.

The embroidery data is stored in the embroidery data storage area 153. The embroidery data is generated by the CPU 11 executing an embroidery data generating program. The embroidery data is data that is to be used when embroidery is performed by the embroidery sewing machine 3. The embroidery data includes a sewing order, needle drop point data and thread color data. A plurality of programs, which include the embroidery data generating program to be executed by the CPU 11, are stored in the program storage area 154. Default values and setting values of various types of parameters, for example, are stored in the other data storage area 155. Note that, in a case where the embroidery data generating apparatus 1 does not include the HDD 15, the embroidery data generating program may be stored in the ROM 13.

The display 24 is connected to the video controller 16, and the keyboard 21 is connected to the key controller 17. A CD-ROM 54 can be inserted into the CD-ROM drive 18. For example, when the embroidery data generating program is set up, the CD-ROM 54 that stores the embroidery data generating program is inserted into the CD-ROM drive 18. Then, the embroidery data generating program is read and stored in the program storage area 154 of the HDD 15. If a memory card 55 is connected to the memory card connector 23, it is possible to read information from the memory card 55 and to write information into the memory card 55.

Figure 3:
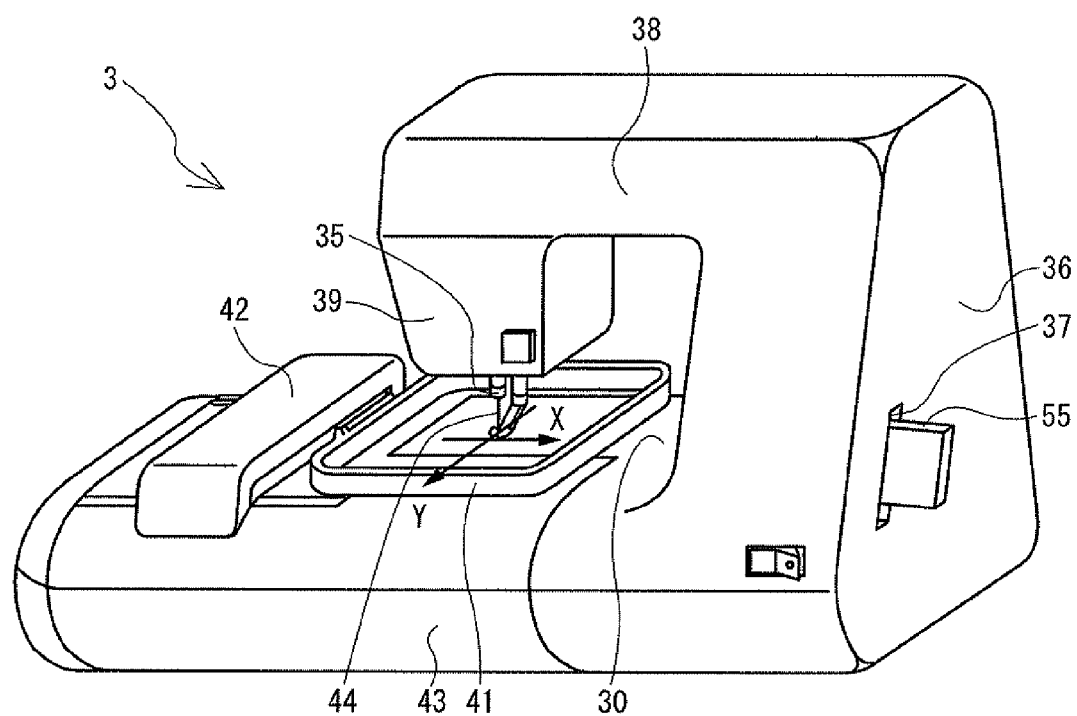
FIG. 3 is an external view of an embroidery sewing machine 3.

The embroidery sewing machine 3 will be explained briefly with reference to FIG. 3. The embroidery sewing machine 3 can sew an embroidery pattern based on the embroidery data generated by the embroidery data generating apparatus 1. As shown in FIG. 3, the embroidery sewing machine 3 includes a bed portion 30, a pillar 36, an arm portion 38 and a head portion 39. The bed portion 30 is longer in the left-right direction with respect to a sewing operator. The pillar 36 extends upward from a right end of the bed portion 30. The arm portion 38 extends leftward from an upper end of the pillar 36. The head portion 39 is connected to a left end of the arm portion 38. An embroidery frame 41 can be arranged on the bed portion 30. The embroidery frame 41 holds a work cloth (not shown in the drawings) on which embroidery will be performed. A Y direction drive portion 42 and an X direction drive mechanism (not shown in the drawings) move the embroidery frame 41 to a predetermined position that is indicated by an XY coordinate system that is specific to the embroidery sewing machine 3. The X direction drive mechanism is accommodated within a main body case 43. In accordance with the movement of the embroidery frame 41, a needle bar 35 to which a sewing needle 44 is attached and a shuttle mechanism (not shown in the drawings) are driven and the embroidery pattern is thereby formed on the work cloth. The Y direction drive portion 42, the X direction drive mechanism and the needle bar 35 are controlled by a control unit (not shown in the drawings) that is built into the embroidery sewing machine 3. The control unit may be formed by a microcomputer or the like.

A memory card slot 37 is provided on a side face of the pillar 36 of the embroidery sewing machine 3. The memory card 55 can be inserted into and removed from the memory card slot 37. The embroidery data generated by the embroidery data generating apparatus 1 may be stored in the memory card 55 via the memory card connector 23. Then, the memory card 55 may be inserted into the memory card slot 37, and the stored embroidery data may be read out and stored in the embroidery sewing machine 3. The control unit (not shown in the drawings) of the embroidery sewing machine 3 automatically controls an embroidery operation performed by the above-described elements, based on the embroidery data supplied from the memory card 55. In this manner, the embroidery sewing machine 3 can sew an embroidery pattern based on the embroidery data generated by the embroidery data generating apparatus 1.

A main processing that is performed by the embroidery data generating apparatus 1 will be explained with reference to FIG. 4 to FIG. 16. When a user inputs a command to start the main processing shown in FIG. 6, the main processing is performed by the CPU 11 in accordance with the embroidery data generating program stored in the HDD 15 shown in FIG. 2. Hereinafter, cases will be explained in which the embroidery data is generated for a pattern 100 of a first specific example shown in FIG. 4 and for a pattern 200 of a second specific example shown in FIG. 5. For the first specific example and the second specific example, a general water soluble sheet is used as the sewing target object.

Figure 4:
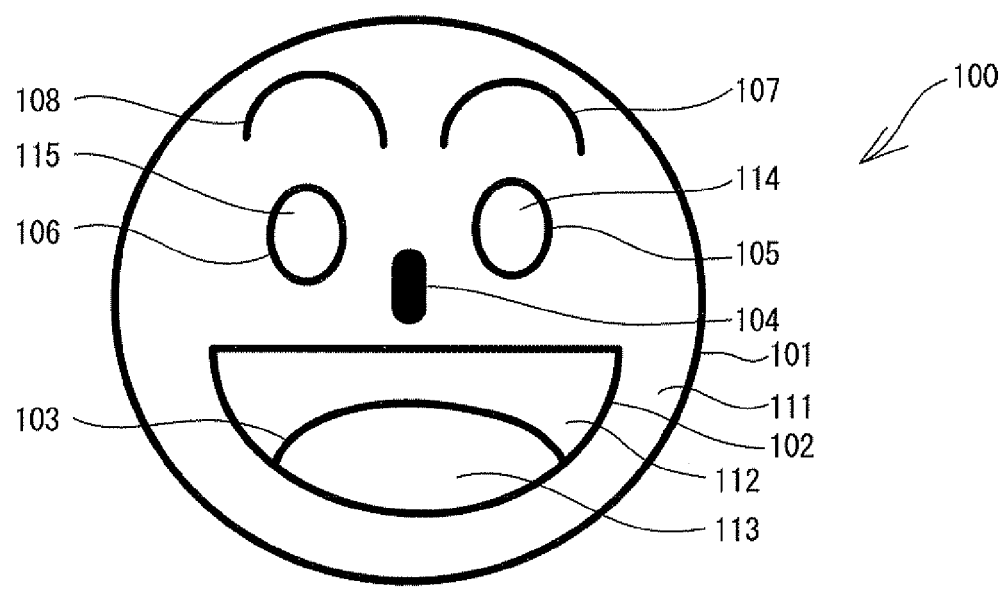
FIG. 4 is an explanatory diagram of a pattern 100 that is represented by image data of a first specific example.

A pattern for which the embroidery data is generated is referred to as a target pattern. The target pattern of the present embodiment is represented by at least one of a line, an area and a pattern. The area is a section surrounded by a line. The pattern is represented by the embroidery data stored in advance in a storage unit. As shown in FIG. 4, the pattern 100 is an illustration of a person's face that is represented by lines 101 to 108 and areas 111 to 115. The area 111 is an area surrounded by the line 101. The area 112 is an area surrounded by the line 102. The area 113 is within the area surrounded by the line 102, and is located below the line 103 in FIG. 4. The area 114 is an area surrounded by the line 105.

The area 115 is an area surrounded by the line 106. In the first specific example, the embroidery data is generated for a case where sewing is performed using a single color (an orange color, for example) of thread.

Figure 5:
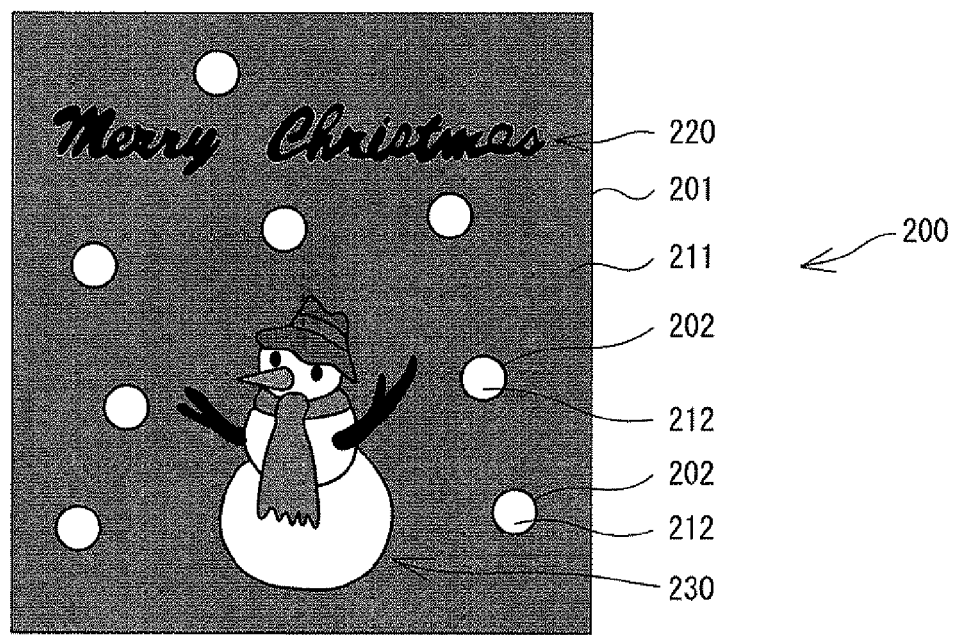
FIG. 5 is an explanatory diagram of a pattern 200 that is represented by image data of a second specific example.

As shown in FIG. 5, the pattern 200 is a Christmas illustration that is represented by an area 211, areas 212, a text pattern 220 and an embroidery pattern 230. The areas 212 are areas surrounded by lines 202. The area 211 is an area surrounded by the line 201, excluding the areas 212. The text pattern 220 represents the letters "Merry Christmas" in a cursive style. The embroidery pattern 230 represents an embroidery pattern of a snowman. The text pattern 220 and the embroidery pattern 230 are patterns that are represented by the embroidery data selected by the user from the embroidery data stored in the embroidery data storage area 153. The areas 212 surrounded by the lines 202 represent white show. In the second specific example, the embroidery data is generated for a case where sewing is performed using a plurality of colors of threads. More specifically, the thread color of the area 211 and the areas 212 is dark blue. The thread color of the text pattern 220 is yellow. The thread colors of the embroidery pattern 230 are black, blue, green, red and white.

Figure 6:
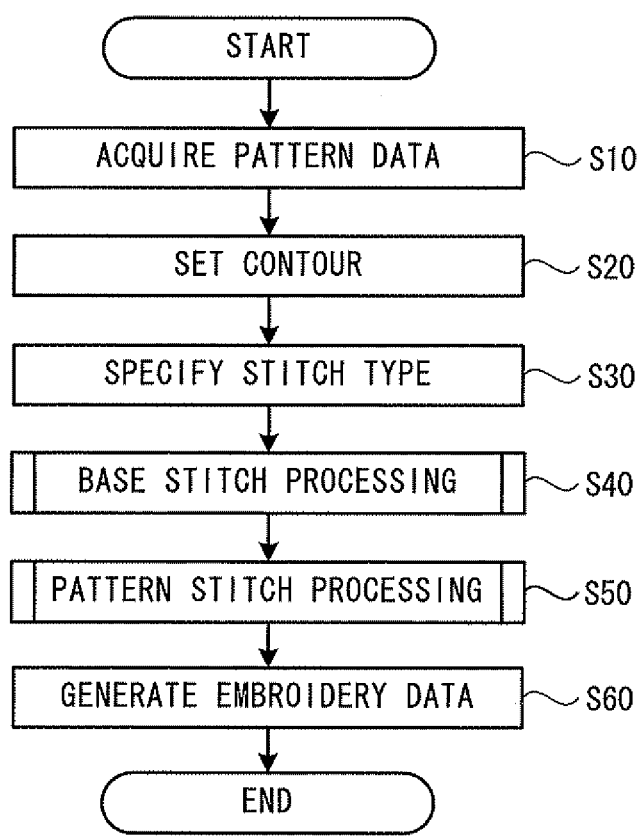
FIG. 6 is a flowchart of a main processing.

As shown in FIG. 6, in the main processing, first, the pattern data is acquired and the acquired pattern data is stored in the RAM 12 (step S10). The pattern data acquired at step S10 represents the target pattern. In a case where the image data is acquired as the pattern data, the image data may be acquired using a given method. For example, from among the image data stored in the embroidery data storage area 151, the image data selected by the user may be acquired. Further, for example, the image data representing an image that is input by the user using the mouse 22 may be acquired. Furthermore, for example, the image data acquired using the image scanner 25 may be acquired. At step S10, for example, in the first specific example, the image data representing the pattern 100 shown in FIG. 4 is acquired. In the second specific example, the image data representing the area 211 and the areas 212 of the pattern 200 shown in FIG. 5, and the embroidery data representing the text pattern 220 and the embroidery pattern 230 of the pattern 200 are acquired.

Next, a setting is made as to whether or not a satin stitch is to be used to sew the contour of the target pattern (step S20). The processing at step S20 may be performed in accordance with a command from the user, or may be performed in accordance with a setting registered in advance. The contour of the pattern 100 is represented by the line 101. The contour of the pattern 200 is represented by the line 201. At step S20, for example, in the first specific example, it is set that the contour is to be sewn and in the second specific example, it is set that the contour is not to be sewn.

Next, a type or types of stitches that represent the target pattern is set (step S30). The stitch type is set by the user, for each of the lines, the areas and the patterns included in the target pattern. For the pattern for which the embroidery data has already been generated, a stitch type in accordance with the embroidery data may be set as it is. The stitch type may be selected from three types of stitches including the satin stitch, a fill stitch and a see-through stitch, for example. The see-through stitch is a stitch with a lower thread density as compared to the satin stitch and the fill stitch. The thread density of the see-through stitches is set such that the sewing target object can be seen through the stitches. A plurality of thread densities can be set as the thread density of the see-through stitches. The thread density of the see-through stitches may be set in accordance with a command from the user, or may be automatically set in accordance with a luminance value of an image representing the pattern.

Normally, the thread density of an embroidery pattern indicates the number of threads, which determines how many threads are to be arranged per unit length to sew stitches of the embroidery pattern. However, in the present embodiment, the thread density of the see-through stitches is set based on the number of overlapping layers whose stitch directions are different from each other. Note that the thread density of the see-through stitches may be set based on the number of threads per unit length of stitches of the embroidery pattern. A method for adjusting the thread density of the see-through stitches will be described later.

In the first specific example, the stitch type is set in the following manner, for example. The satin stitch is set for the line 102 and the line 104 to the line 108 shown in FIG. 4. The satin stitch has been set for the line 101 at step S20. The fill stitch is set for the area 113 to the area 115. The see-through stitch is set for the area 112. The stitch type is not set for the area 111. In the second specific example, the stitch type is set in the following manner, for example. The see-through stitch is set for the area 211 and the areas 212. With respect to the text pattern 220 and the embroidery pattern 230, since the stitch type has been set in accordance with the embroidery data that has already been generated, the stitch type is not newly set.

Next a base stitch processing is performed (step S40). In the base stitch processing, the embroidery data to be used to sew base stitches is generated. The base stitches are a plurality of stitches and include a plurality of intersecting portions that are portions at which two stitches extending in directions different from each other intersect. The base stitches are formed such that the shape of the embroidery pattern is maintained even when, for example, the sewing target object is removed after sewing has been performed in accordance with the embroidery data generated in the main processing.

Figure 7:
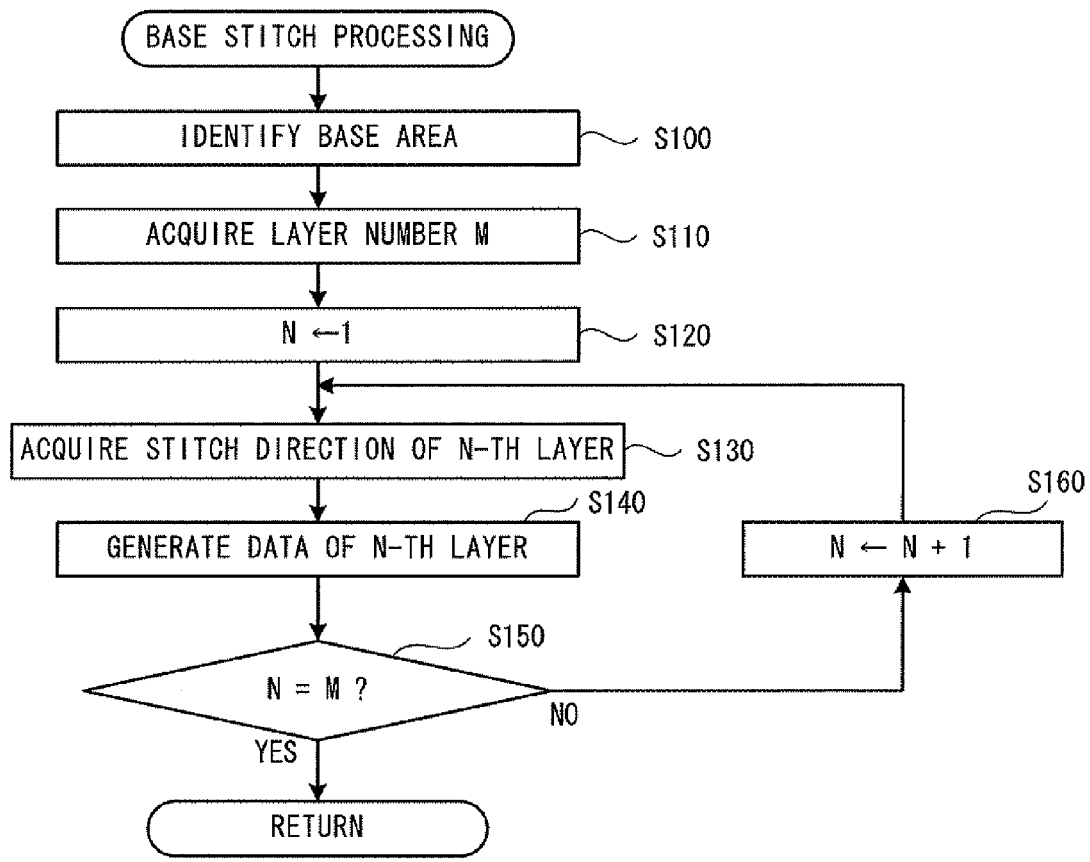
FIG. 7 is a flowchart of a base stitch processing that is performed in the main processing shown in FIG. 6.

The base stitch processing will be explained in more detail with reference to FIG. 7. As shown in FIG. 7, in the base stitch processing, first, a base area is identified and the identified base area is stored in the RAM 12 (step S100). The base area is an area in which the base stitches are formed. The base area may be an area specified by the user, or an area that is inside the contour line of the target pattern and that includes the contour line. In each of the first specific example and the second specific example, the area that is inside the contour line of the target pattern and that includes the contour line is identified as the base area. In a case where the user specifies the base area, it is preferable that the base area is specified such that the embroidery pattern corresponding to a section in which the sewing target object will be removed overlaps with the base area. Therefore, at step S100, processing may be performed such that the user's specification is accepted only when at least a part of the base area specified by the user overlaps with an area of the embroidery pattern, and the user's specification is not accepted when the base area specified by the user does not overlap at all with the area of the embroidery pattern.

Figure 8:
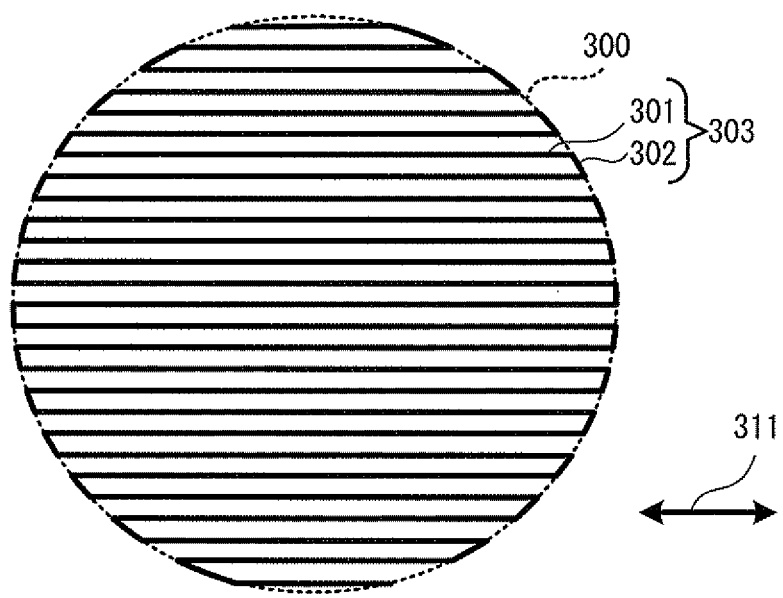
FIG. 8 is an explanatory diagram that shows, using a line 303, an example of a position in which a single layer of stitches is formed when an area within a dotted line 300 is set as a base area.

A layer number M of stitches is acquired and the acquired layer number M is stored in the RAM 12 (step S110). Layers of stitches (hereinafter also referred to as stitch layers) will be explained taking as an example a case in which an area surrounded by a dotted line 300 shown in FIG. 8 is set as the base area. A single line 303 may be set within the base area surrounded by the dotted line 300. The line 303 may include a plurality of first line segments 301 and a plurality of second line segments 302. The first line segments 301 all extend in the same direction (i.e. in the direction of an arrow 311, in the example shown in FIG. 8). The first line segments 301 may be arranged at a predetermined interval in the up-down direction in FIG. 8. The second line segments 302 may connect the first line segments 301 sequentially along the dotted line 300. In the present embodiment, running stitches formed on the line 303 are assumed as a single layer of stitches. The base stitches of the present embodiment are stitches that are formed by overlapping a plurality of stitch layers, in each of which stitches that correspond to the first line segments 301 extend in a direction (hereinafter referred to as a stitch direction) that is different from a stitch direction or stitch directions of the other stitch layer or stitch layers. In the present embodiment, the layer number M is an integer selected from 2 to 6. The layer number M may be one of the following values: a value specified by the user, a value set in advance, or a value set based on a luminance value of the target pattern. In the first specific example, for example, a value of 4 that is specified by the user is acquired. In the second specific example, for example, a value of 2 that is specified by the user is acquired.

Next, a variable N is set to 1 and the set variable N is stored in the RAM 12 (step S120). The variable N is a variable to read out the stitch layers sequentially. Next, a stitch direction of an N-th layer is acquired and the acquired stitch direction is stored in the RAM 12 (step S130). The stitch direction of the N-th layer indicates a direction in which the first line segments 301 (refer to FIG. 8) included in the N-th layer extend. The stitch direction of the N-th layer may be determined in advance as shown in FIG. 9 and is stored in the setting storage area 152. The stitch direction is represented by a counterclockwise angle with respect to the X axis of the XY coordinate system of the embroidery sewing machine 3 (refer to FIG. 3). The stitch direction is represented by an angle that is equal to or larger than 0 degrees and smaller than 180 degrees. As described above, the XY coordinate system is a coordinate system that is used in the process in which the embroidery sewing machine 3 moves the embroidery frame 41. In a case where the variable N is 2, 0 degrees is obtained as the stitch direction.

Next, sewing data to be used to sew stitches of the N-th layer in the base area is generated and the generated sewing data is stored in the RAM 12 (step S140). In a case where the line 101 of the first specific example shown in FIG. 4 corresponds to the dotted line 300 shown in FIG. 8, when the variable N is 2, the sewing data to form running stitches on the line 303 is generated. In a case where the variable N is equal to or larger than 2, the sewing data for running stitches formed on the contour line of the base area is further generated so as to connect the first stitch of the N-th layer to the last stitch of an (N−1)-th layer. Then, it is determined whether or not the variable N is equal to the layer number M acquired at step S110 (step S150). In a case where the variable N is smaller than the layer number M (no at step S150), the variable N is incremented and the incremented variable N is stored in the RAM 12 (step S160). Next, the processing returns to step S130.

Figure 10:
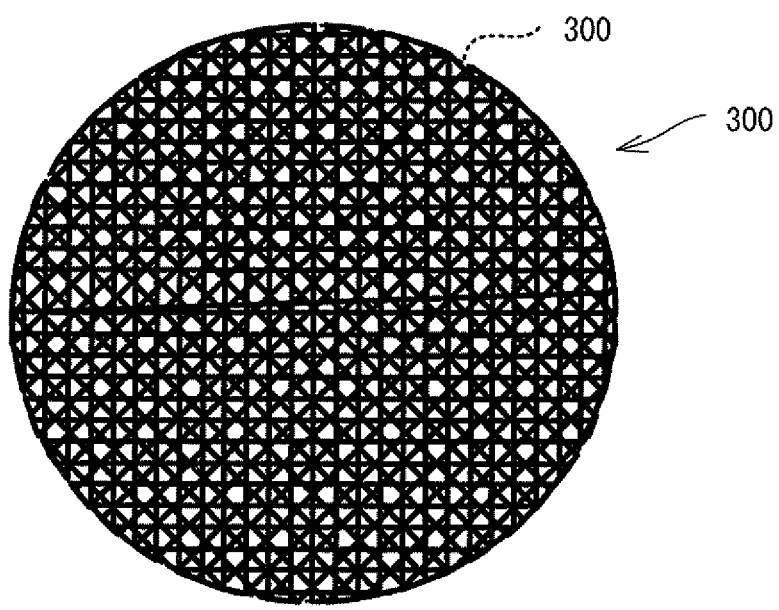
FIG. 10 is a diagram that shows an example of positions in which four layers of stitches are formed when the area within the dotted line 300 is set as the base area.

When the variable N is equal to the layer number M (yes at step S150), the base stitch processing is completed and the processing returns to the main processing shown in FIG. 6. In the first specific example, the sewing data to form running stitches on a line 400 shown in FIG. 10 is generated by the base stitch processing. The line 400 is obtained by overlapping lines that represent positions of stitches of the first to fourth layers. As shown in FIG. 10, the base stitches of the present embodiment are formed in a mesh shape in which there are a plurality of areas surrounded by stitches. The base stitches of the present embodiment have a substantially uniform thread density across the entire base area that is surrounded by the dotted line 300. Although not shown in the drawings, for the second specific example, the sewing data for the base stitches including two layers of stitches is generated by the base stitch processing.

Figure 11:
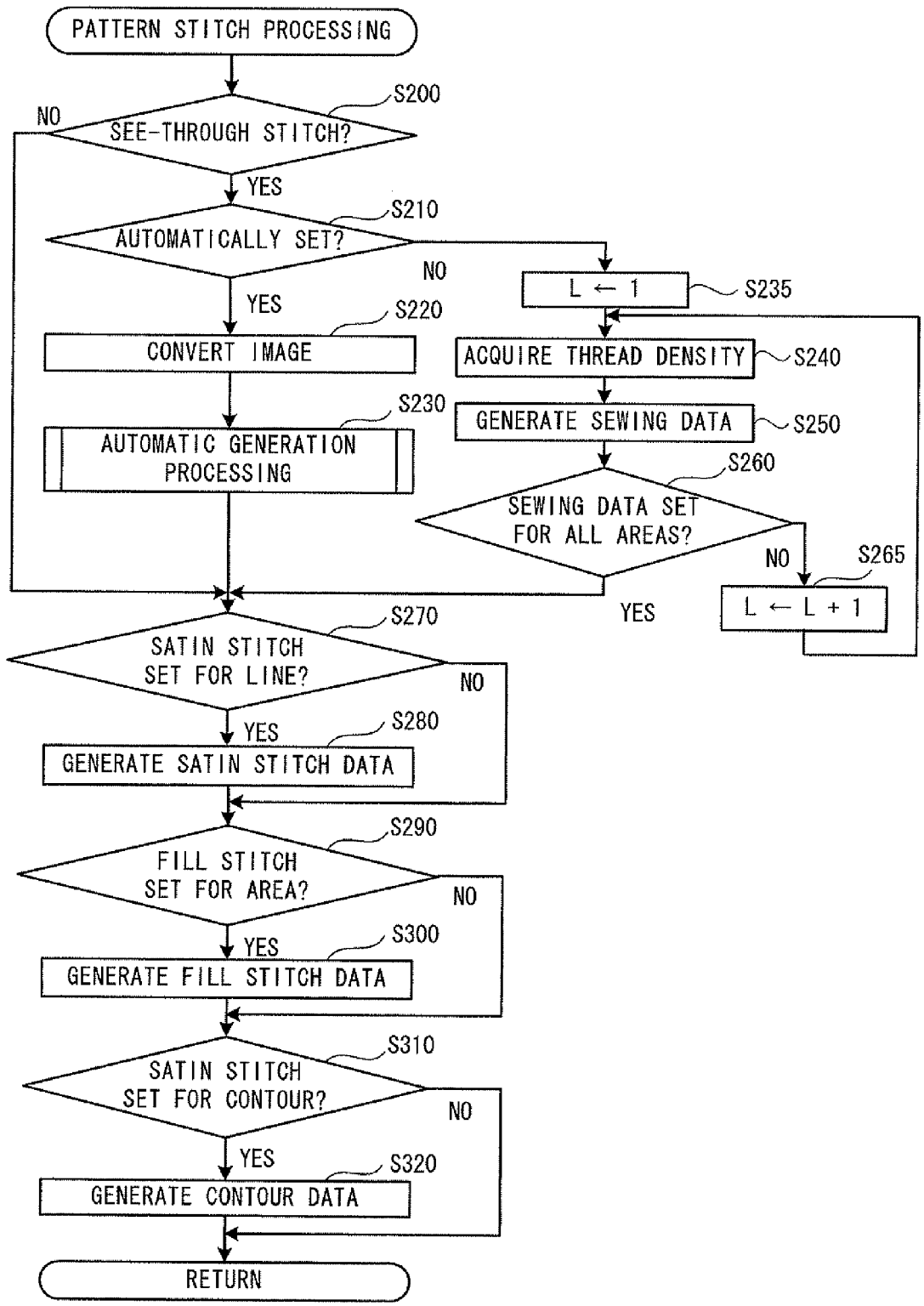
FIG. 11 is a flowchart of a pattern stitch processing that is performed in the main processing shown in FIG. 6.

As shown in FIG. 6, subsequent to the base stitch processing (step S40), a pattern stitch processing is performed (step S50). In the pattern stitch processing, the sewing data to be used to sew the lines and areas included in the target pattern is generated in accordance with the stitch type set at step S30. The pattern stitch processing will be described in more detail with reference to FIG. 11. As shown in FIG. 11, in the pattern stitch processing, first, it is determined whether or not there is an area for which the see-through stitch has been set as the stitch type at step S30 shown in FIG. 6 (step S200). In a case where there is no area for which the see-through stitch has been set (no at step S200), the processing proceeds to step S270, which will be described later. In the first specific example, the see-through stitch has been set for the area 112 (yes at step S200). In the second specific example, the see-through stitch has been set for the area 211 and the areas 212 (yes at step S200). In this case, based on a command from the user or on a set value, it is determined whether or not the thread density of the see-through stitch is automatically set (step S210). The thread density of the see-through stitches is adjusted by the number of overlapping stitch layers, in a similar manner to the base stitches described above.

In a case where the thread density of the see-through stitches is specified by the user in the first specific example (no at step S210), a variable L is set to 1 and the set variable L is stored in the RAM 12 (step S235). The variable L is a variable to sequentially read an L-th area for which the see-through stitch has been set as the stitch type. Next, a thread density of the L-th area, for which the see-through stitch has been set as the stitch type, is acquired and the acquired thread density is stored in the RAM 12 (step S240). The thread density may be specified based on the number of stitch layers in a similar manner to the thread density of the base area. As the number of stitch layers, one of integers from 0 to 7 can be specified, for example. For the first specific example, for example, a layer number 1 is specified as the thread density of the see-through stitches of the area 112. Next, the sewing data to form see-through stitches in the L-th area is generated and the generated sewing data is stored in the RAM 12 (step S250). The processing at step S250 is similar processing to that in the base stitch processing shown in FIG. 7. Note that, in the present embodiment, the stitch direction of the N-th layer of the see-through stitches is different from the stitch direction of the N-th layer of the base stitches shown in FIG. 9.

For the first specific example, at step S250, sewing data is generated in order to form, as the first layer, a stitch layer in which the stitch direction is 45 degrees. Next, it is determined whether or not the sewing data has been generated for all the areas for which the see-through stitch has been set as the stitch type at step S30 shown in FIG. 6 (step S260). More specifically, in a case where the variable L is equal to a number n of the areas for which the see-though stitch has been set as the stitch type, it is determined that the sewing data has been generated for all the areas for which the see-through stitch has been set as the stitch type. In a case where, among the areas for which the see-through stitch has been set as the stitch type, there remains an area for which the sewing data has not been generated (no at step S260), the variable L is incremented and the incremented variable L is stored in the RAM 12 (step S265). The processing returns to step S240. In a case where the sewing data has been generated for all the areas for which the see-through stitch has been set as the stitch type (yes at step S260), the processing proceeds to step S270, which will be described later.

For the second specific example, in a case where the thread density of the see-through stitches is automatically set based on the target pattern (yes at step S210), a color image representing the target pattern is converted to a grayscale image and the grayscale image is stored in the RAM 12 (step S220). A method for converting a color image to a grayscale image is well known and an explanation thereof is therefore omitted. Next, an automatic generation processing is performed (step S230). In the automatic generation processing, based on a luminance value (a tone) of the obtained grayscale image, the sewing data is generated that corresponds to the automatically set thread density of the see-through stitches.

Figure 12:
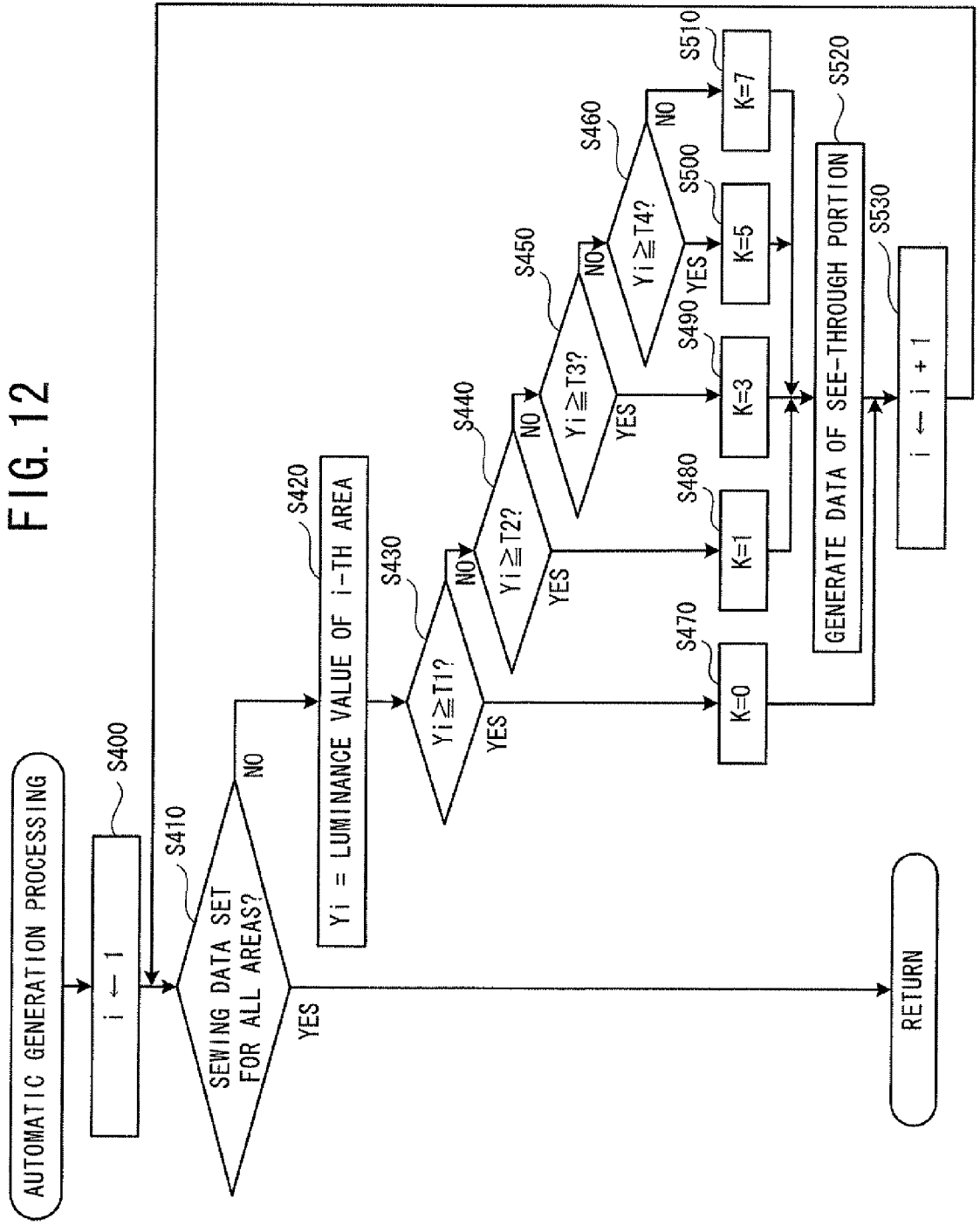
FIG. 12 is a flowchart of an automatic generation processing that is performed in the pattern stitch processing shown in FIG. 11.

The automatic generation processing will be explained in more detail with reference to FIG. 12. As shown in FIG. 12, in the automatic generation processing, first, a variable i is set to 1 and the set variable i is stored in the RAM 12 (step S400). The variable i is a variable to sequentially read out the areas for which the see-through stitch has been set as the stitch type. Next, it is determined whether or not the sewing data has been generated for all the areas for which the see-through stitch has been set as the stitch type at step S30 shown in FIG. 6 (step S410). More specifically, in a case where the variable i is larger than the number n of the areas for which the see-through stitch has been set as the stitch type, it is determined that the sewing data has been generated for all the areas for which the see-through stitch has been set as the stitch type. in a case where there is an area for which the sewing data has not been generated (no at step S410), a luminance value Yi of an i-th area is acquired and the acquired luminance value Yi is stored in the RAM 12 (step S420). For example, in processing of i=1, a luminance value Y1 of the area 211 is acquired, and in processing of i=2, a luminance value Y2 of the areas 212 is acquired.

Next, the acquired luminance value Yi is compared with threshold values T1 to T4 (step S430 to step S460). The threshold values T1 to T4 are values that become smaller in the order of T1, T2, T3 and T4 (T1>T2>T3>T4). The threshold values T1 to 14 may be set taking account of a thread density adjustment method and a luminance of the target pattern. In a case where the luminance value Yi is equal to or larger than the threshold value T1 (yes at step S430), a stitch layer number K is set to 0 (step S470). In a case where the luminance value Yi is equal to or larger than the threshold value T2 and is smaller than the threshold value T1 (no at step S430 and yes at step S440), the stitch layer number K is set to 1 (step S480). In a case where the luminance value Yi is equal to or larger than the threshold value T3 and is smaller than the threshold value T2 (no at step S440 and yes at step S450), the stitch layer number K is set to 3 (step S490). In a case where the luminance value Yi is equal to or larger than the threshold value T4 and is smaller than the threshold value T3 (no at step S450 and yes at step S460), the stitch layer number K is set to 5 (step S500). In a case where the luminance value Yi is smaller than the threshold value T4 (no at step S460), the stitch layer number K is set to 7 (step S510). For the second specific example, for example, the stitch layer number K of the area 211 is set to 7 and the stitch layer number K of the areas 212 is set to 0.

After one of step S480, S490, S500 and step S510, the sewing data is generated to form, in the i-th area, stitches corresponding to the stitch layer number K, and the generated sewing data is stored in the RAM 12 (step S520). In the area 211 of the second specific example, the sewing data to sew seven layers of stitches is generated. Note, however, that the stitch direction of the N-th layer of the see-through stitches is different from the stitch direction of the N-th layer of the base stitches shown in FIG. 9. Further, the third layer to the seventh layer of the see-through stitch layers are stitches that are formed on a line obtained by combining curves as described later with reference to FIG. 15. After step S470 or step S520, the variable i is incremented and the incremented i is stored in the RAM 12 (step S530). Next, the processing returns to step S410. In a case where the sewing data has been generated for all the areas for which the see-through stitch has been set as the stitch type (yes at step S410), the automatic generation processing is completed and the processing returns to the pattern stitch processing shown in FIG. 11.

In FIG. 11, after the automatic generation processing (step S230), it is determined whether or not there is a line for which the satin stitch has been set as the stitch type at step S30 shown in FIG. 6 (step S270). For the first specific example, the satin stitch is set for the line 102 and for the lines 104 to 108 (yes at step S270). In this case, the sewing data to form the satin stitches on each of the line 102 and the lines 104 to 108 is generated and the generated sewing data is stored in the RAM 12 (step S280). A method for generating sewing data for a satin stitch is well known and an explanation thereof is therefore omitted. The processing proceeds to step S290, which will be described later. In a case where there is no line for which the satin stitch has been set as the stitch type (no at step S270), the processing proceeds to step S290.

At step S290, it is determined whether or not there is an area for which the fill stitch has been set as the stitch type. For the first specific example, the fill stitch has been set for each of the areas 113 to 115 (yes at step S290). In this case, the sewing data to form the fill stitches is generated for each of the areas 113 to 115 and the generated sewing data is stored in the RAM 12 (step S300). A method for generating sewing data for a fill stitch is well known and an explanation thereof is therefore omitted. The processing proceeds to step S310, which will be described later. In a case where there is no area for which the fill stitch has been set as the stitch type (no at step S290), the processing proceeds to step S310, which will be described later.

At step S310, it is determined whether or not it has been set at step S20 shown in FIG. 6 that the satin stitches are to be used to sew the contour. For the first specific example, it has been set that the satin stitches are to be used to sew on the line 101, which is the contour (yes at step S310). In this case, the sewing data to form the satin stitches on the line 101 is generated and the generated sewing data is stored in the RAM 12 (step S320). The pattern stitch processing ends and the processing returns to the main processing shown in FIG. 6. In a case where it has not been set that the satin stitches are to be used to sew the contour (no at step S310), the pattern stitch processing ends and the processing returns to the main processing shown in FIG. 6.

In FIG. 6, after the pattern stitch processing (step S50), the embroidery data is generated and the generated embroidery data is stored in the RAM 12 (step S60). At step S60, the embroidery data is generated such that, after the base stitches are sewn based on the stitch data generated at step S40, the lines and areas included in the target pattern will be sewn based on the stitch data generated at step S50. In the present embodiment, a sewing order is determined particularly to reduce running stitches that run between patterns. Then, the main processing ends.

Figure 13:
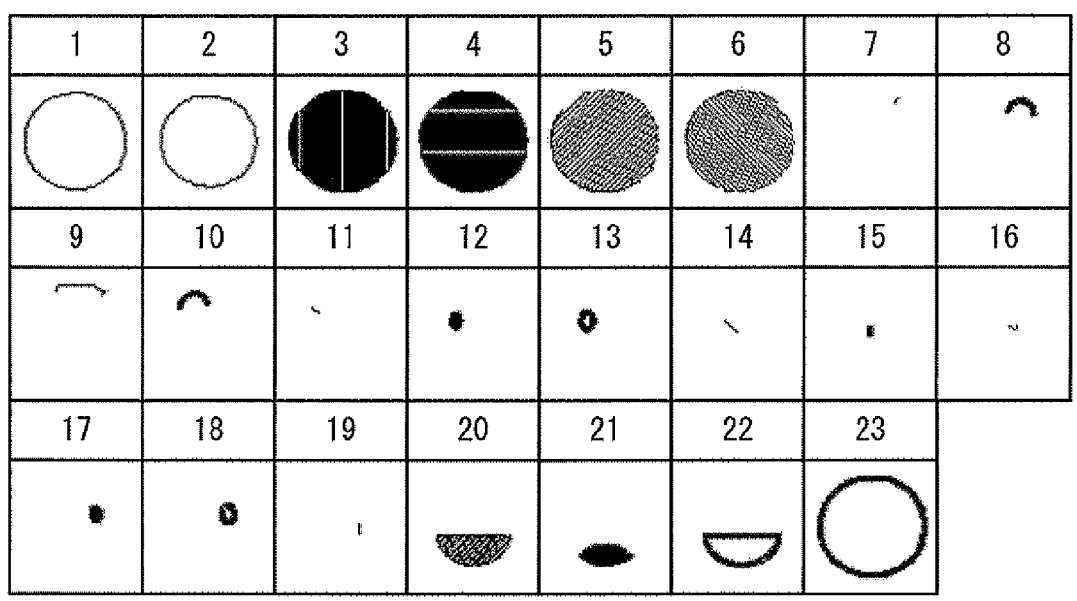
FIG. 13 is a table that shows correspondence between a sewing order and a stitch part when sewing is performed in accordance with embroidery data of the first specific example.

The sewing order of the embroidery data that corresponds to the pattern 100 of the first specific example will be explained with reference to FIG. 4 and FIG. 13. FIG. 13 shows the sewing order (numbers from 1 to 23), partial patterns or stitch parts that correspond to the sewing order, and their stitch types. As shown in FIG. 13, a corresponding relationship between the sewing order of the pattern 100 of the first specific example, and the partial patterns (the stitch parts) and their stitch types is as follows. A first stitch and a second stitch are running stitches to be formed inside the line 101. The first stitch and the second stitch are stitches (so-called underlying stitches) to improve strength in the vicinity of the contour line. A third stitch to a sixth stitch are running stitches to be formed in the base area. The third stitch to the sixth stitch respectively correspond to the stitch layers (the first layer to the fourth layer) included in the base stitches.

An eighth pattern, a tenth pattern, a twelfth pattern, a thirteenth pattern, a fifteenth pattern, a seventeenth pattern, an eighteenth pattern, and twentieth to twenty-third patterns are partial patterns, respectively. More specifically, the eighth partial pattern is a satin stitch pattern representing the line 107. The tenth partial pattern is a satin stitch pattern representing the line 108. The twelfth partial pattern is a fill stitch pattern representing the area 115. The thirteenth partial pattern is a satin stitch pattern representing the line 106. The fifteen partial pattern is a satin stitch pattern representing the line 104. The seventeenth partial pattern is a fill stitch pattern representing the area 114. The eighteenth partial pattern is a satin stitch pattern representing the line 105. The twentieth partial pattern is a see-through stitch pattern representing the area 112. The twenty-first partial pattern is a fill stitch pattern representing the area 113. The twenty-second partial pattern is a satin stitch pattern representing the line 102. The twenty-third partial pattern is a satin stitch pattern representing the line 101 (the contour line). A seventh stitch, a ninth stitch, an eleventh stitch, a fourteenth stitch, a sixteenth stitch and a nineteenth stitch are running stitches that run between the partial patterns, respectively.

Figure 14:
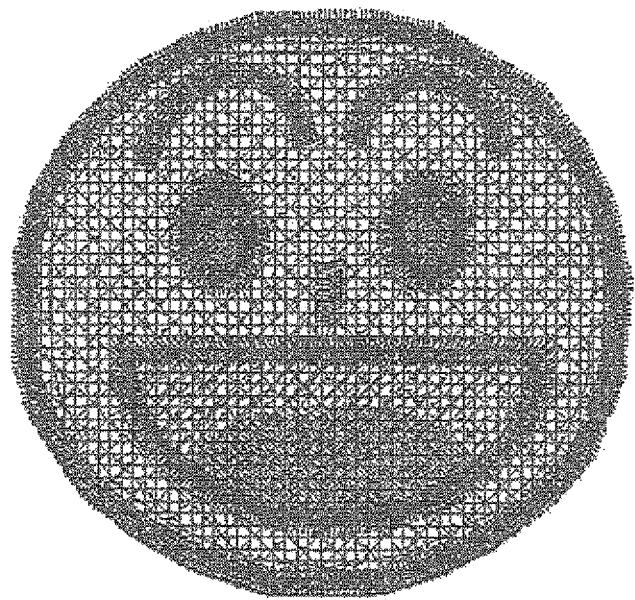
FIG. 14 is a diagram that shows an embroidered object that is obtained when a sewing target object is removed after the sewing has been performed in accordance with the embroidery data of the first specific example.

In the first specific example, when the sewing target object (the water soluble sheet) is removed after the sewing has been performed based on the generated embroidery data, an embroidered object shown in FIG. 14 is obtained. As shown in FIG. 14, the embroidery data is generated to reduce as much as possible the running stitches that run between the patterns. Therefore, in the first specific example, the running stitches that run between the patterns may hardly affect the beauty of the embroidered object. The embroidered object shown in FIG. 14 is a bilaterally symmetric pattern. Therefore, the embroidered object of the first specific example takes on the same pattern regardless of whether it is seen from the front or it is seen from the back. In the first specific example, a section in which the base stitches corresponding to the area 111 are seen and a section of the area 112 excluding the area 113 let light pass through when these sections are seen while the embroidered object is held up to the light. The thread density of the section in which the base stitches corresponding to the area 111 are seen is different from the thread density of the section of the area 112 excluding the area 113. Therefore, the levels of light transmission of these sections are different from each other.

Figure 15:
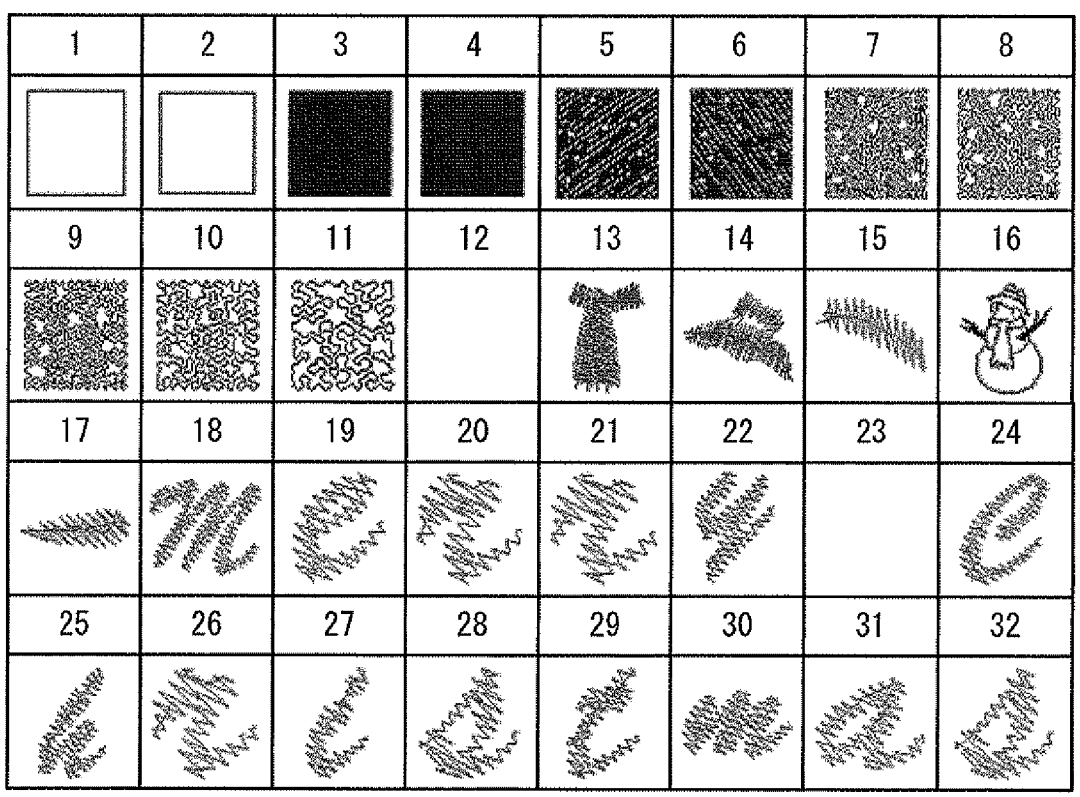
FIG. 15 is a table that shows correspondence between a sewing order and a stitch part when sewing is performed in accordance with embroidery data of the second specific example.

The sewing order of the embroidery data that corresponds to the pattern 200 of the second specific example will be explained with reference to FIG. 5 and FIG. 15. A notation system used in FIG. 15 is the same as that used in FIG. 13. Note, however, that the size of each of partial patterns shown in FIG. 15 is enlarged or reduced as appropriate for ease of visualization. As shown in FIG. 15, a corresponding relationship between the sewing order, and the partial patterns (stitch parts) and their stitch types is as follows. A first stitch and a second stitch are running stitches (so-called underlying stitches) to be formed inside the line 201. A third stitch and a fourth stitch are running stitches to be formed in the base area. The third stitch and the fourth stitch respectively correspond to stitch layers (the first layer and the second layer) included in the base stitches. A fifth stitch to an eleventh stitch are see-through stitches in the area 211 excluding the areas 212. The seventh stitch to the eleventh stitch respectively correspond to the third layer to the seventh layer of stitches included in the see-through stitches. As shown in FIG. 15, the third layer to the seventh layer of stitches are layers of stitches formed on a line obtained by combining curves. Note that, although these curves do not intersect, these curves may intersect.

A twelfth partial pattern to a seventeenth partial pattern are patterns that correspond to the embroidery pattern 230. Although not illustrated in FIG. 15, the twelfth partial pattern corresponds to a white part (the main body of the snowman). The thirteenth partial pattern corresponds to a green part (the main body of the muffler). The fourteenth partial pattern corresponds to a red part (the main body of the hat). The fifteenth partial pattern corresponds to a blue part (the ribbon of the hat). The sixteenth partial pattern corresponds to a black part (the contour line of each part). The seventeenth partial pattern corresponds to an orange part (the nose). An eighteenth partial pattern to a thirty-second partial pattern are yellow stitches that correspond to the text pattern 220. A twenty-third item indicates a space between the twenty-second partial pattern (the letter y in the cursive style) and the twenty-fourth partial pattern (the letter C in the cursive style).

Figure 16:
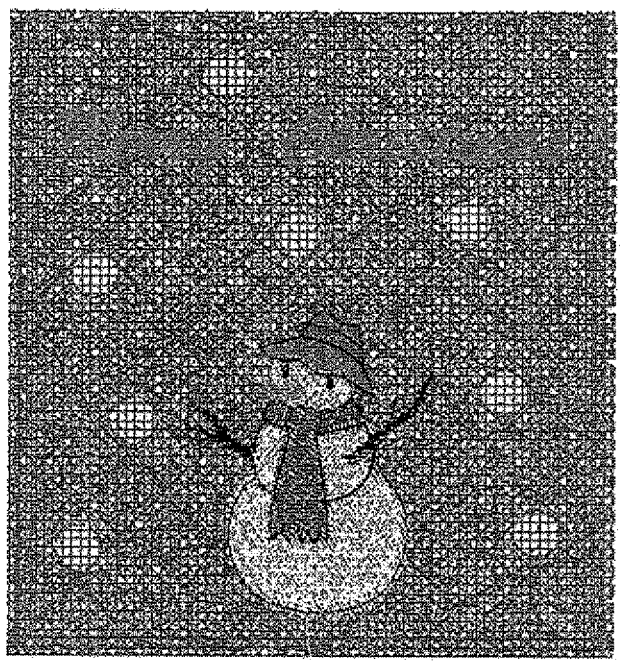
FIG. 16 is a diagram that shows an embroidered object that is obtained when the sewing target object is removed after the sewing has been performed in accordance with the embroidery data of the second specific example.

In the second specific example, when the sewing target object (the water soluble sheet) is removed after the sewing has been performed based on the generated embroidery data, an embroidered object shown in FIG. 16 is obtained. In the second specific example, sections corresponding to the areas 212 and a section corresponding to the area 211 let light pass through when these parts are seen while the embroidered object is held up to the light. The thread density of the sections corresponding to the areas 212 is different from the thread density of the section corresponding to the area 211. Therefore, the levels of light transmission of these sections are different from each other.

With the embroidery data generating apparatus 1, the embroidery data is generated such that an embroidery pattern is sewn on at least part of the base stitches. The base stitches include a plurality of intersecting portions, which are portions at which two stitches (of a plurality of stitches) extending in directions different from each other intersect. Therefore, even when the sewing target object is removed after the embroidery pattern has been sewn on the sewing target object, the shape of the base stitches can be maintained by the plurality of intersecting portions. Further, the shape of the embroidery pattern that has been sewn on the base stitches can also be maintained even when the sewing target object is removed.

In a case where the inside of an outer contour line of the pattern is identified as the base area at step S100 shown in FIG. 7, the embroidery data generating apparatus 1 can omit a user operation to specify the base area. Further, in this case, when the sewing is performed in accordance with the embroidery data, the embroidery pattern is sewn in an area that overlaps with the base area. Therefore, even when the sewing target object is removed, the shape of the embroidery pattern can be maintained reliably. On the other hand, in a case where the area specified by the user is identified as the base area at step S100, the embroidery data generating apparatus 1 can identify the area desired by the user as the base area. The embroidery data generating apparatus 1 can improve a degree of freedom in designing an embroidered object. More specifically, for example, as in the second specific example, the embroidery data generating apparatus 1 can generate the embroidery data to sew the embroidered object with the patterns that are represented by existing embroidery data and that are arranged in the area 211 prepared by the user.

The embroidery data generating apparatus 1 uses, as the base stitches, stitches formed by overlapping a plurality of layers of stitches whose stitch directions are different from each other. However, all the stitches in each layer extend in the same direction. Therefore, according to the embroidery data generated by the embroidery data generating apparatus 1, it is possible to form the base stitches whose stitch directions are aligned. In this case, as compared to base stitches with random shapes, it is possible to easily perform a process that makes the thread density of the base stitches substantially uniform across the entire base area. As shown by the line 400 shown in FIG. 10, the base stitches of the first specific example include a sufficient number of the intersecting portions to maintain the shape after the sewing target object is removed.

As in the second specific example, in a case where the thread density of the embroidery pattern is set based on the tone (the luminance value) of the color of the pattern at step S230 shown in FIG. 11, the embroidery data generating apparatus 1 can omit a user operation to set the thread density of the embroidery pattern. Further, in this case, when the sewing target object is removed after the sewing has been performed in accordance with the embroidery data, the following advantageous effects can be obtained. In an area in which the embroidery pattern and the base area overlap, when the embroidered object is seen while being held up to the light, the level of light transmission of an area in which the base stitches are seen through gaps between the stitches of the embroidery pattern is different from the level of light transmission of an area in which the base stitches are not seen. In the second specific example, when the embroidered object is seen while being held up to the light, the level of light transmission of the areas 212 is larger than that of the area 211. Accordingly, by generating the embroidery data for the area 211 and the areas 212, which are sewn using the same thread color, such that the thread density of the area 211 is different from the thread density of the areas 212, the embroidery data generating apparatus 1 can express a color tone difference between the area 211 and the areas 212. A significant difference in the thread density is observed between the area 211 and the areas 212 in a case in which the embroidered object is seen while being held up to the light, as compared to a case in which the embroidered object is seen while not being held up to the light. In other words, the embroidery data generating apparatus 1 can generate the embroidery data to be used to sew the embroidered object that allows a different pattern to be seen or that gives a different impression, depending on whether the embroidered object is seen while being held up to the light or the embroidered object is seen while not being held up to the light.

The embroidery data generating apparatus 1 of the present invention is not limited to the above-described embodiment, and various modifications may be applied without departing from the spirit and scope of the present invention. For example, any one of the following modifications (A) to (E) may be applied as appropriate.

(A) Although in the above-described embodiment, a personal computer is used as the embroidery data generating apparatus 1, a sewing machine (for example, the embroidery sewing machine 3) that stores the embroidery data generating program may generate the embroidery data. The structure of the embroidery data generating apparatus 1 may be simplified if necessary.

(B) The sewing target object may be any object on which stitches can be formed by an embroidery sewing machine. The sewing target object may be dissolved in part or in whole after embroidering, or the sewing target object may not be dissolved after embroidering. Examples of the sewing target object that can be dissolved in part or in whole after embroidering include a sheet that can be dissolved by a particular agent and a sheet that can be dissolved when heated, as well as a water soluble sheet.

Figure 17:
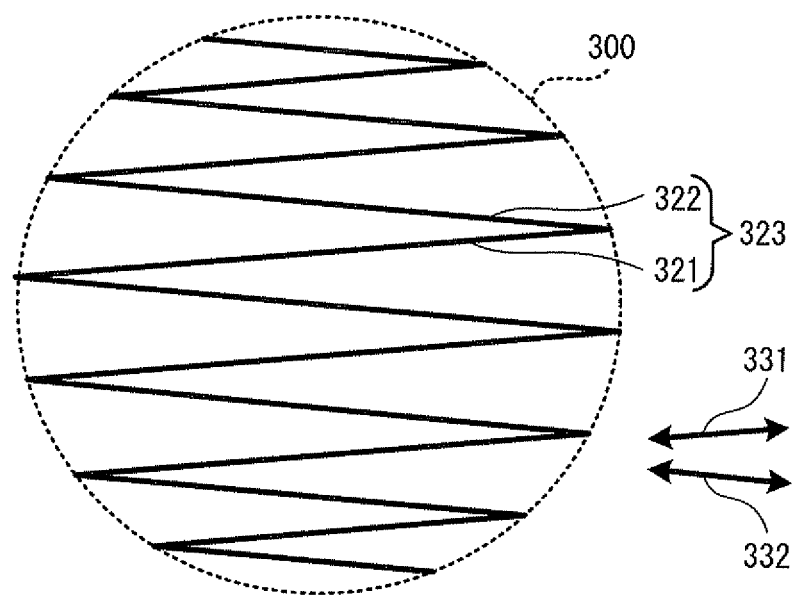
FIG. 17 is a diagram that shows, using a line 323, another example of a position in which a single layer of stitches is formed when the area within the dotted line 300 is set as the base area.
Figure 18:
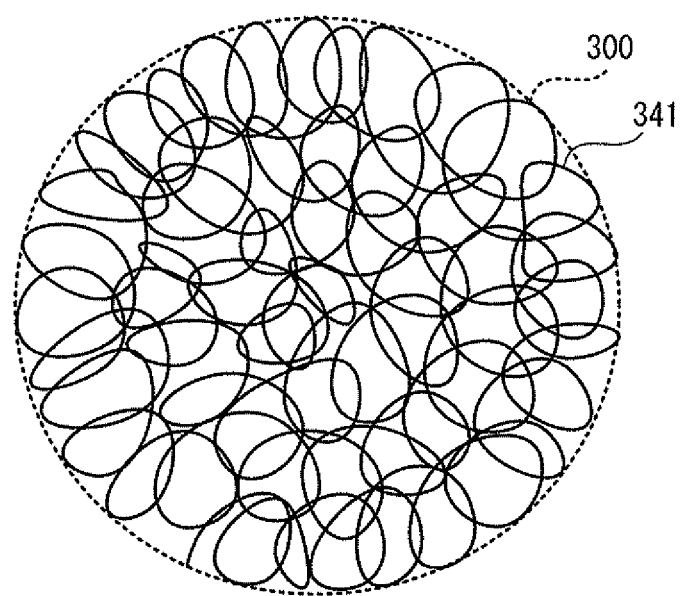
FIG. 18 is a diagram that shows, using a line 341, yet another example of positions in which base stitches are formed when the area within the dotted line 300 is set as the base area.

(C) The base stitches may be a plurality of stitches that include a plurality of intersecting portions at which two of the plurality of stitches which extend in directions different from each other intersect. For example, in a case where the base stitches are stitches that are formed by overlapping a plurality of stitch layers as in the above-described embodiment, the shape in which the stitches are formed in one layer can be changed. More specifically, for example, the shape in which the stitches are formed in one layer may be a zigzag line 323 that includes line segments 321 extending in a first direction 331 and line segments 322 extending in a second direction 332 that is different from the first direction 331 as shown in FIG. 17. Further, for example, the shape in which the stitches are formed in one layer may be a line formed by combining curves as in the seventh to eleventh layers of stitches shown in FIG. 15. Further, for example, the base stitches need not necessarily be stitches that are formed by overlapping a plurality of stitch layers. More specifically, for example, the base stitches may be stitches which are formed on a line formed by combining curves and which include a plurality of intersecting portions as shown in FIG. 18.

Although the base stitches of the above-described embodiment formed in a mesh shape as a whole, the shape of a section corresponding to a mesh may have any shape. Although in the above-described embodiment, the base stitches include running stitches, the base stitches may include another type of stitch. From the viewpoint of the strength of the embroidered object, it is preferable that the thread density of the base stitches be uniform across the entire base area.

(D) The main processing shown in FIG. 6 can be changed. For example, the following modifications (D-1) to (D-5) may be applied to the main processing.

(D-1) A method for identifying the base area can be changed. For example, a minimum rectangular area outside the outer contour of the pattern represented by the pattern data may be automatically identified as the base area. The base area may be an area specified by the user. The base area may be an area inside the contour including the contour of the pattern.

(D-2) A method for acquiring the sewing data used to sew the embroidery pattern represented by the embroidery data can be changed. As in the first specific example, the sewing data that is newly generated may be acquired. In a case where the sewing data is newly generated, the stitch type to sew the embroidery pattern may be changed as appropriate. As in the second specific example, in a case where the sewing data used to sew the embroidery pattern is stored in advance, the sewing data may be acquired from a storage unit.

(D-3) A method for generating the embroidery data can be changed. For example, if the sewing order is determined at step S40 and step S50 shown in FIG. 6, the processing at step S60 may be omitted.

(D-4) A method for setting the thread density of the base stitches and a method for setting the thread density of the embroidery pattern can be changed, respectively. For example, the thread density of the base area may be determined based on the color tone that represents the base area. In this case, a base stitch processing shown in FIG. 19 may be performed at step S40 shown in FIG. 6. In FIG. 19, the same processing as that in the base stitch processing shown in FIG. 7 is denoted by the same step number. As shown in FIG. 19, the base stitch processing of a modified example is different from the base stitch processing shown in FIG. 7 in that step S102 to step S106 are performed instead of step S110. Hereinafter, processing at step S102 to step S106 that is different from the processing in the base stitch processing of the above-described embodiment will be explained.

At step S102, a grayscale image that represents the base area is generated similarly to step S220 shown in FIG. 11. At step S104, the luminance value (the tone) of the base area is acquired based on the generated grayscale image, and the acquired luminance value is stored in the RAM 12. At step S106, the layer number of the base stitches is acquired based on the acquired luminance value, and the acquired layer number is stored in the RAM 12. At step S106, for example, as in step S430 to step S510 shown in FIG. 12, the layer number may be acquired based on a result of comparison between the luminance value acquired at step S104 and the threshold values.

In the base stitch processing of the modified example, the thread density of the base stitches is set based on the tone of the base area. Therefore, when the sewing target object is removed after the sewing has been performed in accordance with the embroidery data, an amount of light that passes through the embroidered object when the embroidered object is seen while being held up to the light differs depending on the thread density. Accordingly, an embroidered object is obtained that allows a different pattern to be seen or that gives a different impression, depending on whether an area in which the base stitches are not covered by the embroidery pattern is seen while the embroidered object is held up to the light or whether this area is seen while the embroidered object is not held up to the light.

(D-5) In the above-described embodiment, the thread density of the base stitches and the thread density of the see-through stitches are adjusted based on the number of stitch layers. However, another method may be used to adjust the thread density. For example, the thread density may be adjusted by adjusting an interval between the stitches that correspond to the first line segments 301 shown in FIG. 8.

(E) Although the luminance value of the grayscale image is used as an example of the color tone, another value may be used. For example, at least one value selected from among the values of luminance, hue, saturation and brightness may be used as the color tone. The method for setting the thread density based on the color tone may be a method in which the thread density is determined by substituting the color tone into a predetermined equation, in addition to the method in which the thread density is determined based on the table in which an associated relationship between the color tone and the thread density is stored, as in the above-described embodiment. In addition, when the color tone changes within one area, a representative value that represents the color tones may be determined for the one area. The representative value that represents the color tones is one of an average value and a mode value, for example. Further, for example, a plurality of color tone values may be determined for one area. In this case, the embroidery data generating apparatus 1 can generate the embroidery data to be used to sew an embroidered object that expresses color tone changes by changing the thread density.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. An embroidery data generating apparatus comprising:
a memory configured to store computer-readable instructions, and
a processor that is configured to execute the computer-readable instructions to:
acquire pattern data representing a pattern that is a target to generate embroidery data;
identify a base area that is an area in which a plurality of base stitches are to be formed, each of the plurality of base stitches being formed by a running stitch, the plurality of base stitches including a plurality of intersecting portions, each of which is a portion at which two base stitches of the plurality of base stitches intersect, the two base stitches extending in directions different from each other, and the plurality of base stitches being formed in a mesh shape;
generate first sewing data to be used to sew the plurality of base stitches in the base area;
acquire second sewing data to be used to sew the pattern represented by the pattern data, in an area that includes at least a part of the base area; and
generate embroidery data which includes the first sewing data and the second sewing data, and in which a sewing order of the first sewing data is set to be in advance of a sewing order of the second sewing data.

2. The embroidery data generating apparatus according to claim 1, wherein
identifying the base area includes identifying, as the base area, one of an area inside an outer contour of the pattern represented by the pattern data and an area specified by a user.

3. The embroidery data generating apparatus according to claim 1, wherein
the plurality of base stitches includes a plurality of stitch layers, each of which includes a plurality of stitches, the plurality of stitches included in each of the plurality of stitch layers all extend in a same direction, which is different from directions of the plurality of stitches included in the other stitch layer; and
generating the first sewing data includes generating, as the first sewing data, sewing data to be used to sequentially sew the plurality of stitch layers.

4. The embroidery data generating apparatus according to claim 1, wherein
the plurality of base stitches includes a plurality of stitch layers, each of which includes a plurality of stitches, the plurality of stitches included in each of the plurality of stitch layers extend in two directions different from each other, the two directions being different from directions of the plurality of stitches included in the other stitch layer; and
generating the first sewing data includes generating, as the first sewing data, sewing data to be used to sequentially sew the plurality of stitch layers.

5. The embroidery data generating apparatus according to claim 1, wherein
the plurality of base stitches are a plurality of stitches which are arranged on a line formed by combining curves and which includes the plurality of intersecting portions.

6. The embroidery data generating apparatus according to claim 1, wherein when the processor further executes the computer-readable instructions to:
set a thread density of the plurality of base stitches based on a color tone of the base area,
wherein generate the first sewing data includes generating, as the first sewing data, data to be used to sew the plurality of base stitches having the thread density.

7. The embroidery data generating apparatus according to claim 1, wherein the processor further executes computer-readable instructions to:
set a thread density of the pattern, based on a color tone of the pattern represented by the pattern data; and
generate, as the second sewing data, data to be used to sew the pattern having the thread density.

8. An embroidery data generating method performed by a computer, comprising the steps of:
acquiring pattern data representing a pattern that is a target to generate embroidery data;
identifying a base area that is an area in which a plurality of base stitches are to be formed, each of the plurality of base stitches being formed by a running stitch, the plurality of base stitches including a plurality of intersecting portions, each of which is a portion at which two base stitches of the plurality of base stitches intersect, the two base stitches extending in directions different from each other, and the plurality of base stitches being formed in a mesh shape;
generating first sewing data to be used to sew the plurality of base stitches in the base area;
acquiring second sewing data to be used to sew the pattern represented by the pattern data in an area that includes at least a part of the base area; and
generating embroidery data which includes the first sewing data and the second sewing data, and in which a sewing order of the first sewing data is set to be in advance of a sewing order of the second sewing data.

9. The embroidery data generating method according to claim 8, wherein
one of an area inside an outer contour of the pattern represented by the pattern data and an area specified by a user is identified as the base area.

10. The embroidery data generating method according to claim 8, wherein
the plurality of base stitches includes a plurality of stitch layers, each of which includes a plurality of stitches, the plurality of stitches included in each of the plurality of stitch layers all extend in a same direction, which is different from directions of the plurality of stitches included in the other stitch layer; and
sewing data to be used to sequentially sew the plurality of stitch layers is generated as the first sewing data.

11. The embroidery data generating method according to claim 8, further comprising the step of:
setting a thread density of the plurality of base stitches based on a color tone of the base area,
wherein data to be used to sew the plurality of base stitches having the thread density is generated as the first sewing data.

12. The embroidery data generating method according to claim 8, further comprising the steps of:
setting a thread density of the pattern based on a color tone of the pattern represented by the pattern data; and
generating data to be used to sew the pattern having the thread density,
wherein the data to be used to sew the pattern having the thread density is acquired as the second sewing data.

13. A non-transitory computer-readable medium storing an embroidery data generating program, the embroidery data generating program comprising instructions, when executed, to cause a computer to perform the steps of:

acquiring pattern data representing a pattern that is a target to generate embroidery data;

identifying a base area that is an area in which a plurality of base stitches are to be formed, each of the plurality of base stitches being formed by a running stitch, the plurality of base stitches including a plurality of intersecting portions, each of which is a portion at which two base stitches of the plurality of base stitches intersect, the two base stitches extending in directions different from each other, and the plurality of base stitches being formed in a mesh shape;

generating first sewing data to be used to sew the plurality of base stitches in the base area;

acquiring second sewing data to be used to sew the pattern represented by the pattern data in an area that includes at least a part of the base area; and generating embroidery data which includes the first sewing data and the second sewing data, and in which a sewing order of the first sewing data is set to be in advance of a sewing order of the second sewing data.

14. The computer-readable medium according to claim 13, wherein one of an area inside an outer contour of the pattern represented by the pattern data and an area specified by a user is identified as the base area.

15. The computer-readable medium according to claim 13, wherein the plurality of base stitches includes a plurality of stitch layers, each of which includes a plurality of stitches, the plurality of stitches included in each of the plurality of stitch layers all extend in a same direction, which is different from directions of the plurality of stitches included in the other stitch layer; and sewing data to be used to sequentially sew the plurality of stitch layers is generated as the first sewing data.

16. The computer-readable medium according to claim 13, wherein the embroidery data generating program further comprises instructions that, when executed, cause the computer to perform the step of setting a thread density of the plurality of base stitches based on a color tone of the base area; and data to be used to sew the plurality of base stitches having the thread density is generated as the first sewing data.

17. The computer-readable medium according to claim 13, wherein the embroidery data generating program further comprises instructions that, when executed, cause the computer to perform the steps of:

setting a thread density of the pattern based on a color tone of the pattern represented by the pattern data; and generating data to be used to sew the pattern having the thread density, and the data to be used to sew the pattern having the thread density is acquired as the second sewing data.

\* \* \* \* \*